Dec. 8 1925.

M. PEARSON

AIRCRAFT

Filed April 27, 1925  4 Sheets-Sheet 1

1,564,972

Inventor.
Martin Pearson.
By
William M. Gentle
his Attorney

Dec. 8, 1925.

M. PEARSON

AIRCRAFT

Filed April 27, 1925  4 Sheets-Sheet 2

1,564,972

Inventor.
Martin Pearson.
By
William M. Gentle
his Attorney.

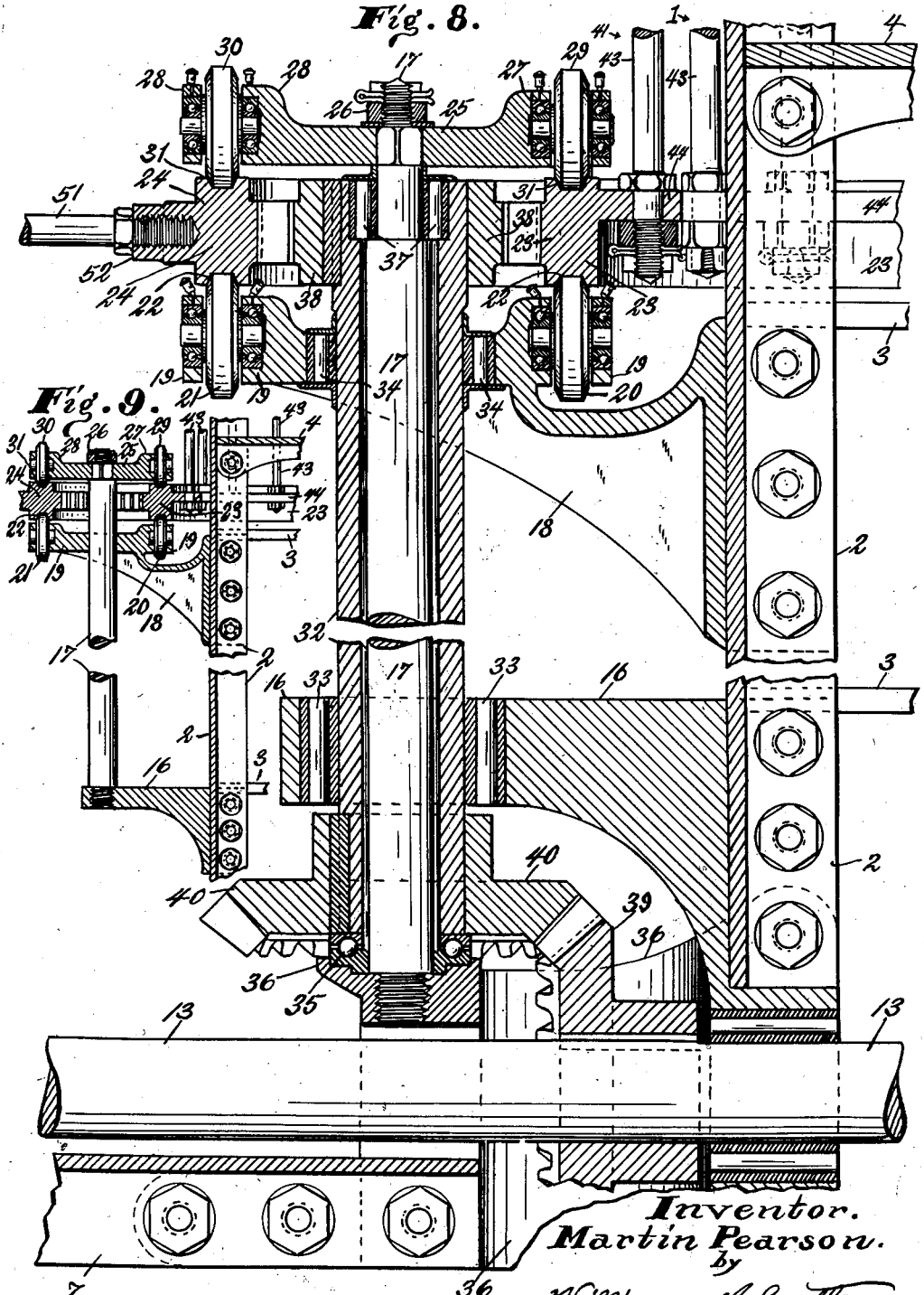

Dec. 8, 1925.
M. PEARSON
AIRCRAFT
Filed April 27, 1925
1,564,972
4 Sheets-Sheet 4
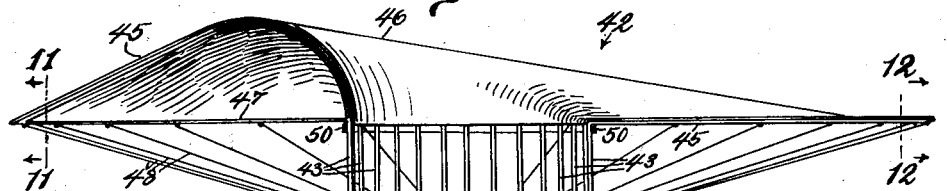
Inventor.
Martin Pearson.
by William M. Gautte
his Attorney.

Patented Dec. 8, 1925.

1,564,972

UNITED STATES PATENT OFFICE.

MARTIN PEARSON, OF LOS ANGELES, CALIFORNIA.

AIRCRAFT.

Application filed April 27, 1925. Serial No. 26,216.

*To all whom it may concern:*

Be it known that MARTIN PEARSON, a citizen of the United States, and a resident of Los Angeles, county of Los Angeles, and State of California, has invented a certain new and useful Aircraft; and he does hereby declare that the following is a full, clear, and exact description thereof, reference being had to the accompanying drawings, in which like numerals refer to like parts.

This invention relates to improvements in the aircraft shown, described and claimed in the United States Letters Patent No. 1,497,789 that was issued to me June 17, 1924.

An object of this invention is to improve the aircraft by providing it with a main and auxiliary helicopter propellers that are arranged to rotate around the same axis and to be driven in opposite directions.

Another object is to provide a main helicopter propeller that is constructed and arranged to deflect the displaced air toward the vertical axis of the aircraft.

Another object is to provide the aircraft with an auxiliary helicopter propeller that can function as a stabilizer and also prevent a rapid descent of the aircraft when it is in flight and its engine has inadvertently or intentionally stopped.

A feature of invention is shown in the construction and arrangement of the helicopter propellers and means for supporting and driving them.

Other objects, advantages and features of invention may appear from the accompanying drawings, the subjoined description, and the appended claims.

The accompanying drawings illustrate the invention.

Fig. 8 is an enlarged fragmental section on line 8—8 of Fig. 6, showing a detail of the means for driving the helicopter propellers.

Fig. 9 is a sectional view on a smaller scale analogous to Fig. 8 showing the means for supporting the floating gears that carry the helicopter propellers.

Fig. 10 is an enlarged central cross section through the cage for supporting the main helicopter propeller showing one of the propeller blades.

Fig. 11 is a fragmental section on line 11—11 of Fig. 10 showing a detailed construction of the curved advanced end of one of the main propeller blades.

Fig. 12 is a fragmental cross section on line 12—12 of Fig. 10 showing a detailed construction of the flattened tip end of one of the main propeller blades.

Fig. 13 is an enlarged fragmental section through a portion of the cage, showing one of the arched ribs to which the propeller blades are secured.

Fig. 14 is an enlarged fragmental section through another portion of the cage, showing one of the flattened ribs to which the tip ends of the propeller blades are secured.

Figure 1:
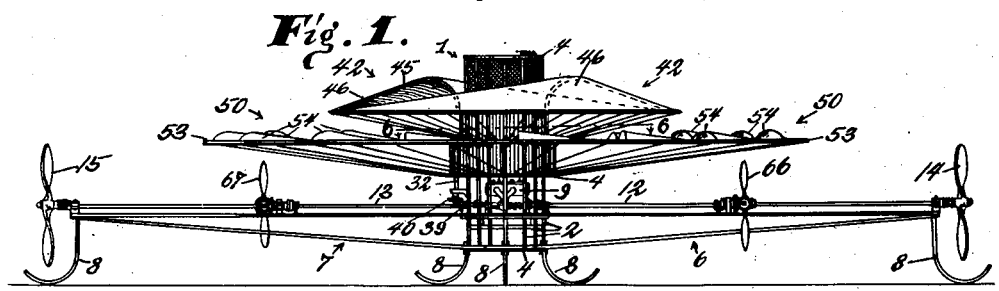
Figure 1 is a side elevation of the aircraft constructed in accordance with the invention, many of the parts being diagrammatically illustrated.

The main frame 1 comprises the upright channel irons 2 that are spaced equidistant apart and an equal radial distance from a common center; and they are connected together by plates 3 so that in a plan view the same is in the form of an octagon.

The frame is additionally braced from the inside by spiders 4.

Adjacent the bottom end of the frame 1 and extending in opposite directions are the frame extensions 6, 7 that can be braced and cross braced to form substantial supports.

The free ends of the extensions 6, 7 and also the bottom ends of the channel irons 2 are provided with curved spring legs 8 that are adapted to yield and prevent excessive shock when the air craft is landing.

An engine 9 is arranged inside of the frame 1 between the extensions 6, 7 on one of the spiders 4; and it is arranged to drive the shafts 12 and 13 to actuate the propellers 14, 15, 66 and 67 when they are to be driven. The construction, operation and arrangement of these propellers and associated parts are substantially like those described in the hereinbefore mentioned patent, and for the sake of clearness and brevity a detailed illustration and description of them is omitted.

Also the air compressor 57 and associated parts, together with the air cylinders 49 for actuating the propeller clutches, shown and described in the patent heretofore mentioned, are omitted from these drawings and are not described in this application as the hereinbefore stated improvements do not reside in these features.

Brackets 16 are connected to each of the channel irons and they are arranged to support stationary cylindrical supports 17 that have their lower ends threaded into the brackets. The upper ends of the supports 17 extend through the brackets 18 that are secured to the channel irons 2; and these brackets are provided with bearing boxes 19 in which are mounted guide wheels 20, 21 that are arranged to extend into annular grooves 22 in the under sides of the respective floating gears 23, 24.

Other brackets 25 are secured by nuts 26 to the squared ends of the posts 17 and these brackets are provided with bearing boxes 27, 28 in which are arranged the guide wheels 29, 30 that are adapted to be fitted into annular grooves 31 in the top sides of the floating gears 23, 24 and these parts are arranged so that the gears 23, 24 can be rotated around a common axis and in opposite directions; and the gears lie in the same plane with the gears 23 within the gear 24.

The means for driving the floating gears 23, 24 is best shown in Fig. 8. As seen therein a hollow shaft 32 is loosely fitted over one of the supports 17 and is provided with roller bearings 33, 34 in the brackets 16, 18; a ball bearing 35 in a bracket 36 and another roller 37 interposed between the upper end of the post 17 and the hollow shaft by which means the shaft is rotatably held in a vertical position.

A pinion 38 is secured to the upper end of the shaft 32 and arranged to engage the teeth of the floating gears 23, 24 so that when the pinion is driven the gears will be rotated in opposite directions.

The hollow shaft 32 is driven by means of a bevel gear 39 on shaft 13 engaging another bevel gear 40 that is secured to the shaft 32 so that when the shaft 13 is actuated the annular gears 23, 24 will be rotated. The shaft 13 can be driven by the engine 9.

Figure 2:
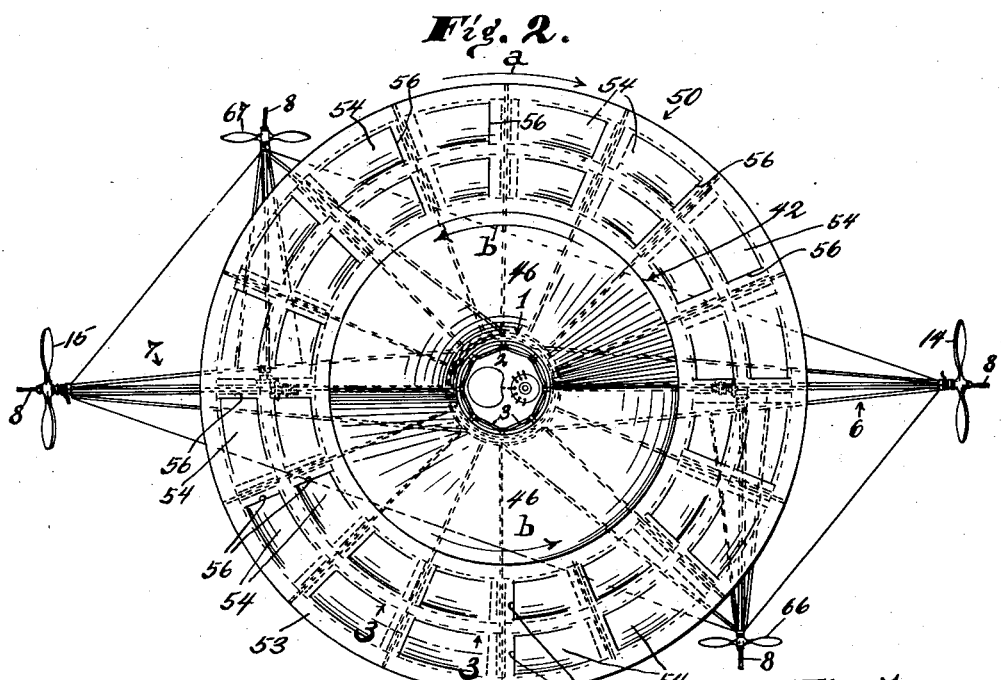
Fig. 2 is a plan view of the aircraft with many of the parts diagrammatically illustrated.

A cage 41 is secured to the floating gear 23; and to this cage is secured the main helicopter propeller 42 that corresponds in construction and operation to the propeller 20 shown and described in the patent hereinbefore mentioned; and this propeller is driven in the direction of the arrows $b$ shown in Fig. 2. The cage 41 is formed of a number of vertical rods 43 that have their lower ends bolted to a flange 44 that is integral with the gear 23, and the upper ends of these rods terminate in ribs 45.

The ribs 45 vary in their formation, as illustrated in Figs. 13 and 14. Ribs 45, such as shown in Fig. 13, are arranged at the advanced ends of the propeller blades and the other ribs, such as shown in Fig. 14, are arranged at the rear end thereof, with the intermediate ribs gradually decreasing in curvature from the advanced to the rear ribs. A metal cover 46 is welded to the ribs as indicated in Figs. 11 and 12. The ribs are provided with braces 47, 48 and the cage 41 is reinforced by annular bands 49.

Preferably the blades of the propeller 42 are curved so that they will displace the air and drive it inward toward the vertical axis of the aircraft.

An auxiliary helicopter propeller 50 is arranged below and extends beyond the main propeller 42 and is supported on and driven by the gear 24.

Figures 3, 5:
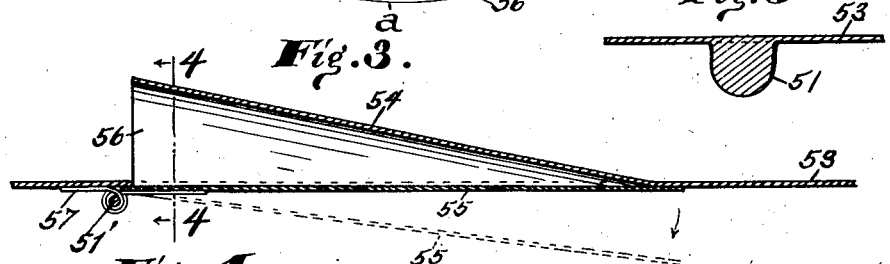
Fig. 3 is an enlarged fragmental section on line 3—3 of Fig. 2.
Fig. 5 is a fragmental cross section on line 5—5 of Fig. 4.
Figure 4:
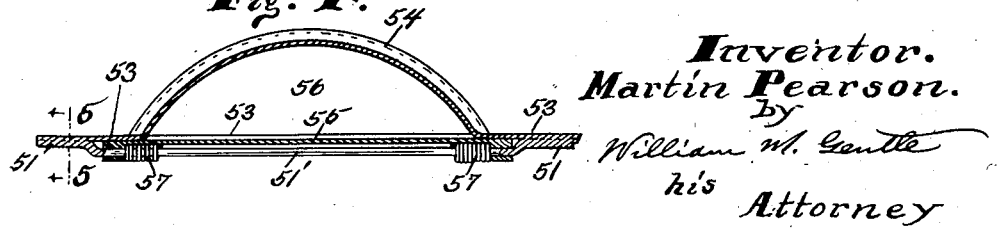
Fig. 4 is a fragmental cross section on line 4—4 of Fig. 3.
Figure 6:
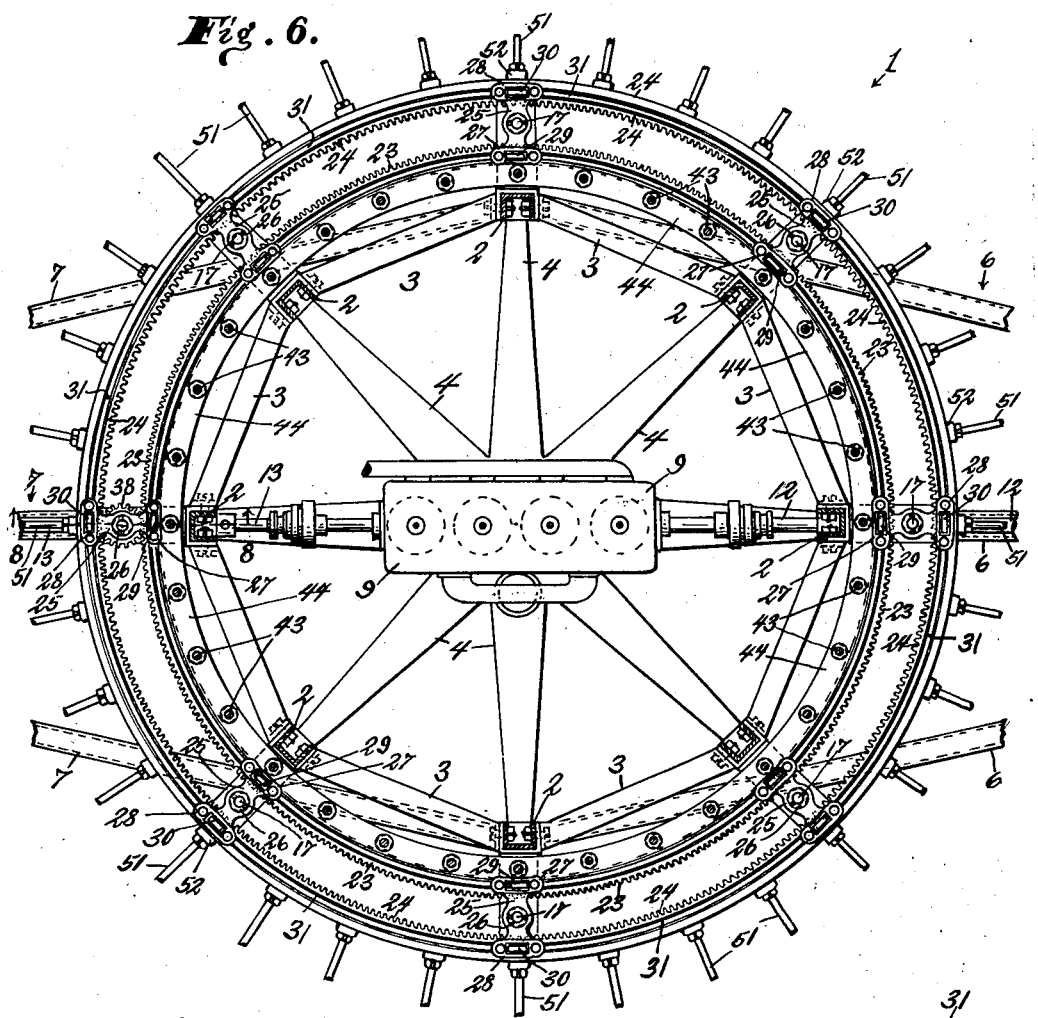
Fig. 6 is an enlarged fragmental section on line 6—6 of Fig. 1 with many of the parts omitted for the sake of clearness.
Figure 7:
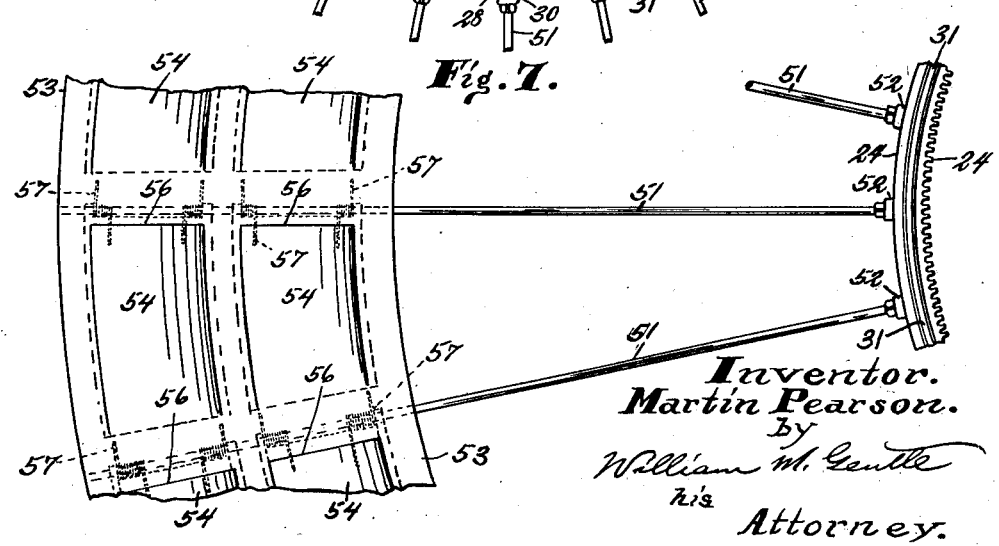
Fig. 7 is a fragmental plan view of the auxiliary helicopter propeller and a portion of the annular rack to which it is connected.

Spokes 51 have their ends threaded into bosses 52 on the outer periphery of the gear 24 and to the outer end portions of the spokes an annular sheet metal disk 53 is secured by welding as indicated in Figs. 3, 4 and 5. The disk 53 is provided with vanes 54 that are constructed and arranged to deflect the air from the top through openings 56 to the under side of the disk when it is driven in the direction of the arrows $a$ shown in Fig. 2.

Trap doors 55 are pivotally mounted on loose portions of the ribs 51 and are arranged under the vanes 54 and are normally held in a closed position by springs 57. These springs yield when the disk 53 is rotated so that the trap doors will open to permit air to pass from the top to the underside thereof whereby the disk and associated parts function as an auxiliary helicopter propeller.

The primary purpose of the disk 53 is to provide a stabilizer that will aid in holding the aircraft in an upright position and will also prevent a rapid descent in the event that the helicopter propellers are either intentionally or accidentally brought to rest. In other words the trap doors 55 close when the aircraft starts to descend so that the disk presents a large air resistance surface to retard its descent. Also in descending part of the displaced air will be forced outward around the annular edge of the disk and another volume of the air will be forced inwardly to contact with the extensive under-surface of the main propeller, thereby stabilizing the aircraft in an upright position as well as retarding its descent.

I claim:

1. The aircraft set forth comprising a frame; supports arranged around and attached to said frame; guide wheels carried by said supports; inner and outer floating gears arranged in the same plane that are supported by said guide wheels; means for rotating said gears around a common axis; and propeller means attached to said gears for lifting said aircraft when said gears are driven.

2. The aircraft set forth comprising a frame; vertical supports arranged around and attached to said frame; bearings secured to said supports and frame; guide wheels in said bearings; inner and outer floating gears arranged in the same plane that are guided and supported by said wheels; means for rotating said gears around a common axis and in opposite directions; vertical rods secured to said inner gear; horizontal spokes secured to said outer gear and propeller means attached to said rods and spokes for lifting said air craft when said gears are driven.

3. The air craft set forth comprising a frame, vertical supports spaced equidistant around and attached to said frame; bearings secured to said supports and frame; guide wheels in said bearings; an outer floating gear and an inner gear within the outer gear that are supported by said wheels and also arranged to rotate around a common axis; vertical rods secured to said inner gear; a helicopter propeller attached to said rods; horizontal spokes secured to said outer gear; an auxiliary helicopter propeller secured to said spokes; a pinion for driving said floating gears in opposite directions; and means for driving said pinion.

4. The aircraft set forth comprising a frame; supports spaced equidistant around and attached to said frame; bearings secured to said supports and frame; guide wheels in said bearings; inner and outer floating gears supported by said wheels; a vertical cage supported by said inner gear; a main helicopter propeller secured to said cage; spokes secured to said outer gear; and an auxiliary helicopter propeller secured to said spokes.

5. The aircraft set forth comprising a frame; supports spaced around and attached to said frame; guide wheels on said supports; a floating gear supported by said wheels; spokes secured to said gear; an annular disk secured to said spokes; vanes integral with said disk that are adapted to deflect air downward through openings in said disk; and means for driving said gear to rotate said disk.

6. The aircraft set forth comprising a frame; supports spaced around and attached to said frame; guide wheels on said supports; a floating gear supported by said wheels; spokes secured to said gear; an annular disk secured to said spokes; vanes integral with said disk that are adapted to deflect air downward through openings in said disk; trap doors for closing the openings through said disk when it is at rest, said doors adapted to open when said disk is rotated in a direction to deflect air through the openings thereof; and means for driving said gear to rotate said disk.

In witness whereof, I have hereunto affixed my signature.

MARTIN PEARSON.